United States Patent
Nagai et al.

(10) Patent No.: US 6,503,544 B2
(45) Date of Patent: Jan. 7, 2003

(54) ANIMAL FEED ADDITIVES

(75) Inventors: Takuya Nagai, Nasu-gun (JP); Hiroyuki Suzuki, Nasu-gun (JP); Ryuichi Azuma, Nasu-gun (JP); Zino Kikuchi, Nasu-gun (JP); Yukihiro Motozono, Chuo-ku (JP); Yuji Tsuchihashi, Nasu-gun (JP)

(73) Assignee: Nisshin Feed Inc., Tokyo (JP)

( * ) Notice: Subject to any disclaimer, the term of this patent is extended or adjusted under 35 U.S.C. 154(b) by 0 days.

(21) Appl. No.: 09/931,950

(22) Filed: Aug. 20, 2001

(65) Prior Publication Data

US 2002/0039606 A1 Apr. 4, 2002

(30) Foreign Application Priority Data

Aug. 21, 2000 (JP) .......................... 2000-249157

(51) Int. Cl.$^7$ ............ A23K 3/00; A23K 1/14; A23K 3/03
(52) U.S. Cl. ............ 426/53; 426/61; 426/52; 426/807; 426/62
(58) Field of Search ................ 426/61, 52, 53, 426/807, 62

(56) References Cited

U.S. PATENT DOCUMENTS

| | | | | |
|---|---|---|---|---|
| 3,624,222 A | * | 11/1971 | Nelson | 424/128 |
| 4,910,024 A | * | 3/1990 | Pratt | 426/2 |
| 5,350,588 A | * | 9/1994 | Campbell | 426/431 |
| 5,747,020 A | * | 5/1998 | Rutherford et al. | 424/93.45 |
| 6,077,546 A | * | 6/2000 | Irivani et al. | 426/2 |

FOREIGN PATENT DOCUMENTS

| | | | |
|---|---|---|---|
| CN | 1148470 | * | 4/1997 |
| JP | 61-119144 | | 6/1986 |
| JP | 5-276878 | | 10/1993 |
| JP | 6-209720 | | 8/1994 |
| JP | 2000-139360 | | 5/2000 |

* cited by examiner

Primary Examiner—Chhaya D. Sayala
(74) Attorney, Agent, or Firm—Oblon, Spivak, McClelland, Maier & Neustadt, P.C.

(57) ABSTRACT

The present invention relates to an animal feed additive, which comprises at least two components selected from the group consisting of the following three components (a), (b) and (c):

(a) at least one herb selected from Pine Needle, Hawthorn Fruit, Bighead Atractylodes Rhizome, Milkvetch Root, Skullcap Root, Tangerine Fruit and Mint Siftings; (b) a live bacteria mixture composed of a yeast cell wall and a live bacteria preparation containing *Lactobacillus acidophilus* and/or *Enterococcus faecium*; and (c) an organic acid.

3 Claims, No Drawings

ANIMAL FEED ADDITIVES

BACKGROUND OF THE INVENTION

1. Field of the Invention

The present invention relates to animal feed additives.

2. Description of the Related Art

A variety of animal feed additives have conventionally been proposed. For example, known are a meet-quality improving feed (Japanese Patent Application Laid-Open (Kokai) No. 61-119144) which comprises, as an essential component, the powder, extract and/or fermentation product of at least one plant selected from ginseng, watermelon, loofah, sweet tea vine (Jiaogulan), cucumber, melon, licorice, soybean, hare's ear root (*Bupleurum falcatum*), a(d)zuki bean and tea leaves; a feed additive for improving smell of animal meat (Japanese Patent Application Laid-Open (Kokai) No. 5-276878) which comprises one or more than one of black pepper, clove, ginger, garlic and onion, and essential oils thereof; a method for improving meat quality (Japanese Patent Application Laid-Open (Kokai) No. 6-209720) which comprises mixing a material containing tannin, caffeine, etc., with a conventional feed and supplying domestic animals with the resulting mixed feed; and a feed (Japanese Patent Application Laid-Open (Kokai) No. 2000-139360) comprising mannan and a mannan degrading enzyme.

Each of these related arts is however developed for limited uses.

SUMMARY OF THE INVENTION

The present inventors have therefore carried out various investigations on a general-purpose animal feed additive usable for multiple purpose applications. As a result, they have completed the present invention.

The present invention relates to an animal feed additive, which comprises at least two components selected from the group consisting of the following components (a), (b) and (c):

(a) at least one herb selected from Pine Needle, Hawthorn Fruit, Bighead Atractylodes Rhizome, Milkvetch Root, Skullcap Root, Tangerine Fruit and Mint siftings;

(b) a live bacteria mixture composed of a yeast cell wall and a live bacteria preparation containing *Lactobacillus acidophilus* and/or *Enterococcus faecium;* and (c) an organic acid.

The animal feed additive according to the present invention brings about a variety of effects such as improvement in the smell of animal meat, imparting of an animal with disease resistance, antibacterial action, immunoactivation, hormone regulation, antioxidant action, suppression of proliferation of microorganisms, regulation of the stomach, regulation of metabolism and improvement of appetite.

DETAILED DESCRIPTION OF THE PREFERRED EMBODIMENTS

The herbs to be added as the component (a) to the animal feed additive of the present invention can be used as are or if necessary, after ground down or in the form of an essential oil. These herbs may be used either singly or in combination according to the using purpose. When at least two herbs are employed, they are usually mixed at an equal ratio, but their amounts can be adjusted as needed according to uses.

The live bacterial mixture to be added to the animal feed additive of the present invention as the component (b) contains a yeast cell wall and *Lactobacillus acidophilus* and/or *Enterococcus faecium.*

The yeast cell wall to be used in the present invention can be fractionated from various yeast cells in a conventional manner. It usually contains, in addition, yeast and/yeast fermentation product. Examples of the yeast usable here include Saccharomyces spp. strains such as *Saccharomyces cerevisiae, Saccharomyces uvarum, Saccharomyces diastaticus* and *Saccharomyces rouxii;* Schizosaccharomyces spp. strains such as *Schizosaccharomyces pombe;* Saccharomycodes spp. strains such as *Saccharomycodes ludwigii;* Hanseniaspora spp. strains such as *Hanseniaspora valbyensis;* Kluyveromyces spp. strains such as *Kluyveromyces fragilis* and *Kluyveromyces lactis;* Pichia spp. strains such as *Pichia membranaefaciens;* Hansenula spp. strains such as *Hansenula anomala;* Debaryomyces spp. strains such as *Debaryomyces hansenii;* Lipomyces spp. strains such as *Lipomyces starkeyi;* Brettanomyces spp. strains such as *Brettanomyces bruxellensis;* and Candida spp. strains such as *Candida utilis, Candida tropicalis* and *Candida lipolytica.*

The live-bacteria mixture of the present invention can be prepared by mixing a live bacteria preparation composed of *Lactobacillus acidophilus* and/or *Enterococcus faecium* with a yeast cell wall. *Lactobacillus acidophilus* and *Enterococcus faecium* are each preferably microencapsulated for heightening stability upon storage and availability in vivo.

*Lactobacillus acidophilus* and *Enterococcus faecium* can be microencapsulated separately as described above. Alternatively, their mixture prepared in advance may be microencapsulated.

In the live bacteria mixture of the present invention, *Lactobacillus acidophilus* and/or *Enterococcus faecium* may be added in an amount of $1\times10^5$ to $1\times10^{12}$ CFU/g, preferably $1\times10^8$ to $1\times10^{10}$ CFU/g relative to 1 g of a yeast cell wall.

As the organic acid to be added as the component (c) to the animal feed additive of the present invention, various organic acids may be used. Examples include citric acid, malic acid, fumaric acid, formic acid, propionic acid, lactic acid and tartaric acid. Of these, citric acid, fumaric acid, formic acid and lactic acid are preferred.

The animal feed additive of the present invention contains at least two components selected from the group consisting of the components (a), (b) and (c). In other words, it contains a combination of components (a) and (b), components (a) and (c), components (b) and (c) or components (a), (b) and (c).

The animal feed additive of the present invention contains 30 to 70 wt. % of the herb (a), 20 to 50 wt. % of the live bacteria mixture (b), and 10 to 50 wt. % of the organic acid (c), of which the animal feed additive containing 40 to 60 wt. % of (a), 30 to 40 wt. % of (b) and 15 to 40 wt. % of (c) is particularly preferred.

The animal feed additive of the present invention can be fed to animals as is, but in general, feeding of it as a feed mixture is preferred. Although the mixing ratio of this animal feed additive differs depending on the kind of animals to be fed or feeding purpose, addition of 0.0001 to 3 wt. % to feed is usually preferred.

Animals to be fed with the animal feed additive of the present invention are, for example, swine, fowl and cattle.

The animal feed additive of the present invention is more effective when used in combination with an antibacterial agent such as oxytetracycline, morantel citrate, efrotomycin or colistin sulfate.

EXAMPLES

The present invention will hereinafter be described more specifically by the following examples.

Example 1

An animal feed additive was prepared by adding, to 50 parts by weight of an equal herb mixture of Pine Needle, Hawthorn Fruit, Bighead Atractylodes Rhizome, Milkvetch Root, Skullcap Root, Tangerine Fruit and Mint Siftings, 50 parts by weight of a live bacteria mixture composed of a cell wall of *Saccharomysces cerevisiae* and a live bacteria preparation obtained by microencapsulating *Lactobacillus acidophilus* and *Enterococcus faecium* (each microcapsule containing $5 \times 10^9$ CFU/g relative to 1 g of the cell wall).

Example 2

An animal feed additive was prepared by mixing 50 parts by weight of the herb mixture employed in Example 1, 17 parts by weight of lactic acid, 22 parts by weight of formic acid, 10 parts by weight of fumaric acid and 1 part by weight of citric acid.

Example 3

An animal feed additive was prepared by mixing 50 parts by weight of the live bacteria mixture employed in Example 1, 17 parts by weight of lactic acid, 22 parts by weight of formic acid, 10 parts by weight of fumaric acid and 1 part by weight of citric acid.

Example 4

An animal feed additive was prepared by mixing 40 parts by weight of the herb mixture used in Example 1, 30 parts by weight of the live bacteria mixture used in Example 1, 10 parts by weight of lactic acid, 13 parts by weight of formic acid, 6 parts by weight of fumaric acid and 0.6 part by weight of citric acid.

Test 1

Established were three test plots, each plot having 8 LW castrated male pigs (25 kg in weight) and 7 female pigs (25 kg in weight) at 61 days of age. A feed obtained by adding, to a basal diet as shown below in Table 1, 0.5 wt. % of the animal feed additive prepared in Example 1 was fed to the above-described test pigs and its growth improving effect was studied from the result of their breeding for 28 days.

For comparison, a control plot wherein pigs were fed only with a basal diet is shown.

The test results are as shown in Table 2.

TABLE 1

|  | Mixing ratio (%) |
|---|---|
| Maize | 630.2 |
| Fish meal | 46 |
| Soybean meal | 230 |
| Defatted rice bran | 13 |
| Cake crumbs | 10 |
| Calcium carbonate | 10 |
| Calcium secondary phosphate | 9 |
| Salt | 2.5 |
| Animal fat/oil | 40 |
| Premix | 9.3 |
| Total | 1000 |

TABLE 2

|  | Test plot added with the animal feed additive prepared in Example 1 | Control |
|---|---|---|
| Weight increase a day g/day/pig | 818 ± 142 | 682 ± 145 |
| Feed intake a day g/day/pig | 1987 | 1787 |
| Feed conversion ratio | 2.43 | 2.62 |

Test 2

Established were three test plots, each plot having 8 LW castrated male pigs (10 kg in weight) and 7 female pigs (10 kg in weight) at 36 days of age. A feed obtained by adding, to a basal diet as shown the above Table 1, 0.5 wt. % of the animal feed additive prepared in Example 2 was fed to the test pigs and its growth improving effect was studied from their breeding for 21 days.

For comparison, a control plot wherein pigs were fed only with a basal diet is shown.

Test results are as shown in Table 3.

TABLE 3

|  | Test plot added with the animal feed additive prepared in Example 2 | Control |
|---|---|---|
| Weight increase a day g/day/pig | 616 ± 89 | 502 ± 120 |
| Feed intake a day g/day/pig | 1140 | 994 |
| Feed conversion ratio | 1.85 | 1.98 |

Test 3

Established were two test plots, each plot having 8 LW castrated male pigs (25 kg in weight) and 7 female pigs (25 kg in weight), each at 60 days of age. A feed obtained by adding, to a basal diet as shown above in Table 1, 0.5 wt. % of the animal feed additive prepared in Example 3 was fed to the test pigs and they were bred for 28 days.

For comparison, a control plot wherein pigs were fed only with the basic feed as shown in Table 1 is shown.

The test results are as shown in Table 4.

Test 4

Established were three test plots, each plot having 10 LW castrated male pigs (10 kg in weight) and 10 female pigs (10 kg in weight), each at 35 days of age. A feed obtained by adding, to a basal diet as shown above in Table 1, 0.5 wt. % of the animal feed additive prepared in Example 4 was fed to the test pigs and they were bred for 28 days.

For comparison, a control plot wherein pigs were fed only with the basic feed as shown in Table 1 is shown.

The test results are as shown in Table 5.

TABLE 4

|  | Test plot added with the animal feed additive prepared in Example 3 | Control |
|---|---|---|
| Weight increase a day g/day/pig | 830 ± 122 | 666 ± 115 |
| Feed intake a day g/day/pig | 1934 | 1725 |
| Feed conversion ratio | 2.33 | 2.59 |

TABLE 5

| | Test plot added with the animal feed additive prepared in Example 4 | Control |
|---|---|---|
| Weight increase a day g/day/pig | 656 ± 150 | 478 ± 109 |
| Feed intake a day g/day/pig | 1102 | 889 |
| Feed conversion ratio | 1.68 | 1.86 |

What is claimed is:

1. An animal feed additive, which comprises at least two components selected from the group consisting of the following three components (a), (b) and (c):
   (a) at least one herb selected from Pine Needle, Hawthorn Fruit, Bighead Atractylodes Rhizome, Milkvetch Root, Skullcap Root, Tangerine Fruit and Mint Siftings;
   (b) a live bacteria mixture composed of a yeast cell wall and a live bacteria preparation containing *Lactobacillus acidophilus* and/or *Enterococcus faecium;* and
   (c) an organic acid.

2. An animal feed additive according to claim 1, wherein the organic acid is at least one organic acid selected from citric acid, malic acid, fumaric acid, formic acid, propionic acid, lactic acid and tartaric acid.

3. An animal feed additive according to claim 1 or 2, wherein the components (a), (b) and (c) are added in amounts of 30 to 70 wt. %, 20 to 50 wt. % and 10 to 50 wt. %, respectively.

* * * * *